United States Patent [19]

Curtis et al.

[11] 4,040,023

[45] Aug. 2, 1977

[54] RECORDER TRANSFER ARRANGEMENT MAINTAINING BILLING DATA CONTINUITY

[75] Inventors: Robert Bartlett Curtis; Nelson Andrew Riedel, both of Columbus, Ohio

[73] Assignee: Bell Telephone Laboratories, Incorporated, Murray Hill, N.J.

[21] Appl. No.: 643,140

[22] Filed: Dec. 22, 1975

[51] Int. Cl.$^2$ .................. G06F 3/08; G06F 7/04; G05B 11/16
[52] U.S. Cl. ............................. 364/900; 179/7 R
[58] Field of Search .................. 340/172.5; 445/1; 179/7 R

[56] References Cited

U.S. PATENT DOCUMENTS

| | | | |
|---|---|---|---|
| 3,252,149 | 5/1966 | Weida et al. | 340/172.5 |
| 3,312,947 | 4/1967 | Raspanti | 340/172.5 |
| 3,401,380 | 9/1968 | Bell et al. | 340/172.5 |
| 3,409,877 | 11/1968 | Alterman et al. | 340/172.5 |
| 3,409,879 | 11/1968 | Keister | 340/172.5 |
| 3,503,048 | 3/1970 | Ausan | 340/172.5 |
| 3,533,082 | 10/1970 | Schnabel et al. | 340/172.5 |
| 3,557,315 | 1/1971 | Kobus et al. | 179/15 |
| 3,623,014 | 11/1971 | Doelz | 340/172.5 |
| 3,651,480 | 3/1972 | Downing et al. | 340/172.5 |
| 3,668,644 | 6/1972 | Looschen | 340/172.5 |
| 3,816,663 | 7/1974 | Goodale | 179/7 MM |
| 3,882,455 | 5/1975 | Heck et al. | 340/146.1 BE |
| 3,898,621 | 8/1975 | Zelinski et al. | 340/172.5 |
| 3,921,141 | 11/1975 | Wilber et al. | 340/172.5 |
| 3,964,056 | 6/1976 | Charpentier et al. | 340/172.5 |
| 3,991,407 | 11/1976 | Jordan et al. | 340/172.5 |
| Re. 27,703 | 7/1973 | Stafford et al. | 340/172.5 |

Primary Examiner—Gareth D. Shaw
Assistant Examiner—Jan E. Rhoads
Attorney, Agent, or Firm—M. S. Landis; Charles H. Davis

[57] ABSTRACT

Redundant but independently operable data processors called encoders are arranged so that control of a particular recorder gathering billing data in a telephone switching system can be transferred while maintaining billing continuity for calls being handled by that recorder. More specifically, each encoder checks the validity of billing information received from each recorder. However, each encoder only transmits billing data pertaining to a designated group of recorders to a remote processor. When an encoder detects that it is not receiving valid data from one of its designated recorders, the control of only that designated recorder is transferred to the other encoder if the other encoder indicates that it is receiving valid data from that recorder. Moreover, the relinquishing encoder sends a message to the remote processor indicating that it is giving up control of the designated recorder, while the accepting encoder inhibits the transmission of information to the remote processor for a predetermined time interval and then transmits a message indicating that it has accepted control of the designated recorder. This delay ensures that the remote processor will receive the relinquish message before the acceptance message so that the continuity of processing billing data for calls handled by the designated recorder can be maintained.

13 Claims, 3 Drawing Figures

FIG. 3

RECORDER TRANSFER ARRANGEMENT MAINTAINING BILLING DATA CONTINUITY

FIELD OF THE INVENTION

This invention pertains to automatic message accounting equipment and apparatus for transferring control of data sources in a manner to maintain the continuity of billing data reception; and more particularly this invention pertains to an arrangement in which a plurality of recorders can be individually associated and disassociated with a pair of independently operable data processing units.

BACKGROUND OF THE INVENTION AND PRIOR ART

Switching systems assigned to interconnect calling telephone stations with called telephone stations are often provided with automatic message accounting (AMA) equipment arranged to assess message charges against calling telephone stations. When a telephone station is utilized to originate a call to a called telephone station, the serving switching system, normally an electromechanical local office, accesses automatic message accounting equipment to record an initial entry identifying the calling telephone station, the called telephone station, and the switching system trunk equipment used to establish a call connection. After the call connection has been established, the switching system trunk equipment detects answer of the call by the called telephone station and again accesses the automatic message accounting equipment in order that an answer entry may be recorded identifying the time the call was answered. Subsequently the switching system trunk equipment detects the disconnect of the telephone stations from the call connection and again accesses the automatic message accounting equipment in order that a disconnect entry identifying the disconnect time of the call connection may be recorded. Thus, for each telephone call, the AMA equipment records three entries (i.e., initial, answer, disconnect) which in combination indicate the called and calling telephone station identities, the time that the call was answered and the time that the telephone stations were disconnected from the call connection.

The trunk equipment of a switching system is comprised of a number of trunk circuits that are arranged to connect one switching system with another to establish call connections between the calling and called telephone stations. Normally, groups of trunks bid for the services of a recorder which in turn accesses an associated perforator to record the initial, answer, and disconnect entries on paper tape.

The paper tapes produced by the various perforators are normally physically carried to a centralized data processing system where they are each read in reverse order and the three billing entries associated with each call are placed in sequence so that the requiring charges can be computed. The billing information on each tape is interspersed with entries from various of the 100 trunks which are normally served by a single recorder.

In one prior art system it was recognized that the paper tape medium was not a very good source of billing information because of its low information density, bulk, difficulty of copying, etc.; and this system provided a magnetic tape arrangement to replace the paper perforators. This arrangement gathers billing data directly from a group of recorders and places the billing data directly on magnetic tape. This system provides redundant structure limited to memory and a pair of tape decks which are switched when the end of a particular magnetic tape is reached. A malfunction in the nonduplicated hardware could possibly cause, for an indeterminate time, the loss of billing information for 10 recorders each serving up to 100 trunks. Such an outage could result in severe revenue losses. In the prior art perforator arrangement, each recorder was associated with its own perforator so most hardware problems would only invalidate the billing data for a particular recorder. However, when a data processing system is utilized to gather data from a plurality of recorders, any malfunction in key equipment in this processing unit can cause a massive loss of billing information.

It is an object of our invention to provide a data gathering system adapted to maintain the integrity of billing data reception during most data processing malfunctions.

It is a further object of our invention to provide a data gathering system in which billing information is transmitted to a centralized processing unit, and even during partial system outages, billing data is transmitted to the centralized processing unit in a manner such that it can maintain the continuity of received billing information.

It is a further object of our invention to maintain the continuity of billing data reception even when recorders are manually associated or disassociated with data processing units.

SUMMARY OF THE INVENTION

In accordance with the principles of our invention, a pair of independently operable but redundant data processors called encoders interrogate a plurality of data sources, normally recorders, to gather billing data therefrom. Each encoder checks the validity of billing data from each of the recorders. However, the recorders are initially assigned on a primary-secondary relationship to the encoders. An encoder will only transmit billing data received from recorders for which it is primary to a remote centralized processor via a data link. For secondary recorders, the encoder only checks the validity of the billing data therefrom.

When an encoder discovers it has received invalid data from one of its primary recorders, it then checks whether or not the other encoder has received valid data from that recorder. If the secondary encoder has not received valid data, the primary encoder assumes that the data is invalid, and so marks the data; however, if the secondary encoder indicates the data is valid, the primary encoder assumes that it has malfunctioned, and transfers control of only that recorder to the other encoder. Thus, the primary and secondary relationship between the encoders for that particular recorder is now reversed, so that now the other encoder transmits billing data for that recorder to the remote processor.

Thus in accordance with an aspect of our invention, each encoder checks the validity of billing data from each recorder, but for data transmission the recorders are selectively associated and disassociated with the encoders. The primary and secondary encoder relationships for any particular recorder can be altered while the primary and secondary relationships for the other recorders remain the same.

When a switch of the primary-secondary statuses has occurred, the "relinquishing" encoder, which was relegated from primary to secondary status, generates a relinquish message indicating that it is giving up control of a particular recorder. This relinquish message is temporarily buffered and then transmitted to the remote processor. In contrast, the "accepting" encoder, which was altered from secondary to primary status, generates an acceptance message indicating it is accepting control of the particular recorder and buffers this message. This encoder then inhibits the transmission of any data to the remote processor for a predetermined time interval and at the end of this time interval, the acceptance message is sent to the remote processor with the buffered messages. During this time interval, this encoder continues to buffer billing data from its all "primary" recorders. This time delay is designed so that the remote processor will receive the relinquish message before the acceptance message so that it realizes that subsequent billing data from the particular recorder will be received over the data link associated with the other encoder.

Thus, in accordance with another aspect of our invention, after a transfer of encoders has occurred, relinquish and acceptance messages are generated and the transmission of the acceptance message is delayed so that the remote processor will receive the relinquish message before the acceptance message so that the continuity of reception of billing information can be maintained.

In this one illustrative embodiment of our invention, a recorder control circuit is associated with each recorder. This recorder control circuit contains status indications indicating to both encoders the present primary-secondary statuses assigned that recorder. When an encoder concludes that the other encoder should transmit the billing data for one of its primary recorders, it operates a contact which causes the primary and secondary status relationships indicated by the associated recorder control circuit to the encoders to be altered. This greatly facilitates the assigning of primary and secondary relationships between each recorder and the encoders, and allows these relationships to be easily altered on an individual recorder basis.

Thus, in accordance with another feature of our invention, a control circuit is associated with each recorder to indicate the primary-secondary relationship in regard to only that recorder, and the primary encoder can easily control the circuit to reverse the indicated relationship.

The use of individual recorder control circuits also facilitates manual switchovers between encoders during normal maintenance activities without any loss of billing information. When the primary-secondary statuses of a recorder are altered by a craftperson by activating a contact in the associated control circuit, this status change is detected by each of the encoders which generates the appropriate acceptance and relinquish messages in the manner described above. The transmission of the acceptance message is delayed as described above so that the continuity of billing information can be maintained at the remote processor.

Thus, in accordance with still another aspect of our invention, when control of a recorder is manually transferred to the other encoder, both encoders generate appropriate messages and transmit the messages in a manner such that the remote processor can maintain billing continuity.

BRIEF DESCRIPTION OF THE DRAWING

The foregoing as well as other objects, features and advantages of our invention will be more apparent from a description of the drawing in which.

GENERAL DESCRIPTION

In this one illustrative embodiment of our invention, a billing data transmitter is included in an existing telephone switching system to gather automatic message accounting (AMA) information from a plurality of recorders RCDR_, check the validity of the information, change its format and then transmit it over a data link to a remote processing unit which stores the information on magnetic tape. This billing data transmitter is adapted to replace existing perforating equipment which now places the AMA information on paper tape.

Figure 1:
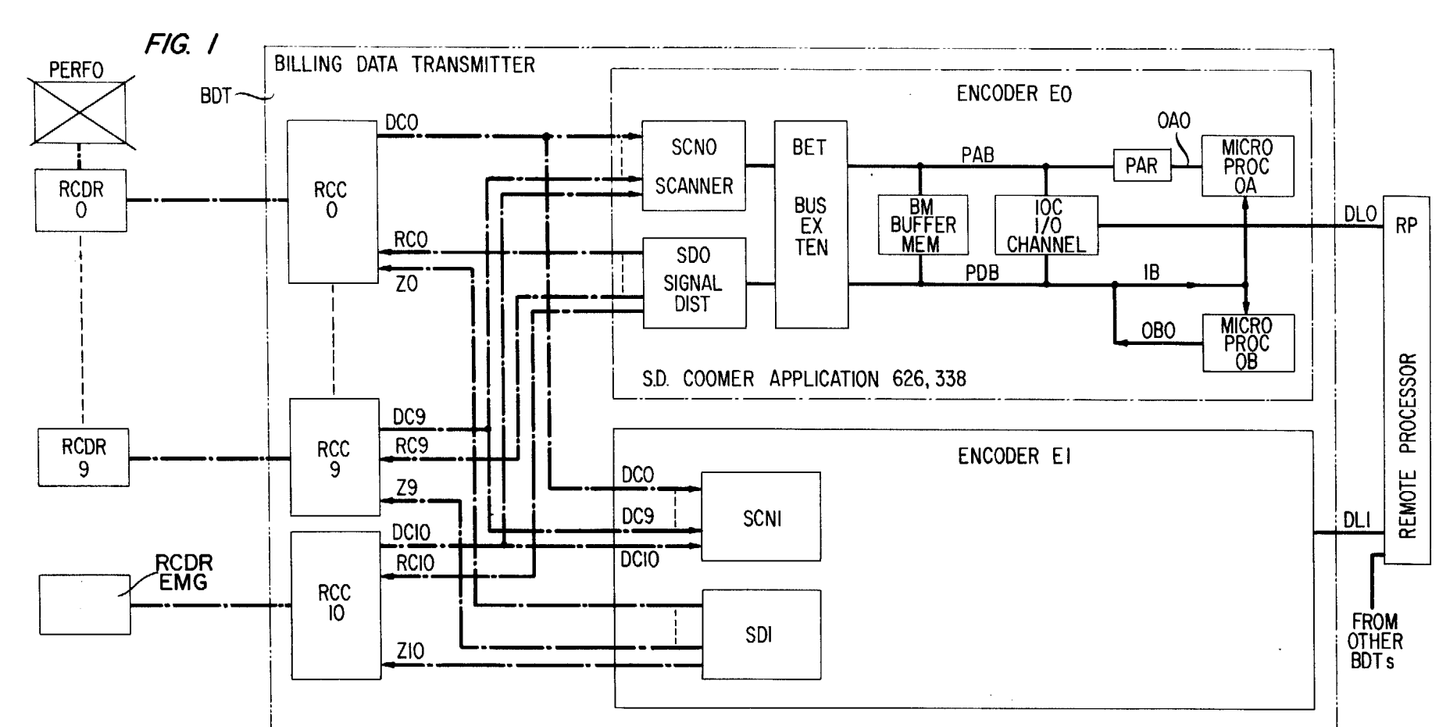
FIG. 1 illustrates in generalized form a billing data transmitter including duplicated encoders operative in accordance with the principles of our invention.

Now turning to FIG. 1, eleven recorders designated RCDR0-RCDR9 and an emergency recorder RCDREMG are illustrated. Each of these recorders services 100 trunk circuits which bid for access to the recorders through numerous circuits (not shown), such as senders, transverters and call identity indexers. The specific manner in which billing data is received by the recorders is described in R. B. Curtis et al, application Ser. No. 516,624, filed Oct. 21, 1974, now U.S. Pat. No. 3,934,090, issued Jan. 20, 1976, and in more detail in H. D. Cahill et al., U.S. Pat. No. 2,599,358, issued June 3, 1952, and will be described herein only to the extent necessary to fully understand the operation of this illustrative embodiment of our invention.

Figure 2:
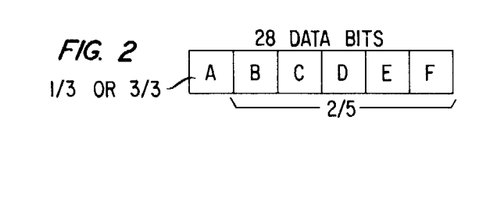
FIG. 2 illustrates the format of each line of billing information generated by the recorders in FIG. 1.

The format of billing information provided by the recorders is illustrated in FIG. 2. Twenty-eight data bits are provided over parallel leads such as cable DCO in FIG. 1 and are subdivided into six groups or digits of information designated A, B, . . . , F. The A group comprises 3 bits (designated A0, A1 and A2) and each of the other groups B-F comprise 5 bits (designated B0, B1, B2, B4 and B7 for example). The 3 bits of information in the A group are provided in one-out-of-three or three-out-of-three format, depending upon the type of call. The data bits in the other groups are provided in a two-out-of-five format.

In the prior art systems, each recorder was associated with its own perforator. For example, as illustrated in FIG. 1, recorder RCDR0 was associated with perforator PERF0. This perforator would detect the state of certain leads in the recorder indicating that a line of billing data was available. The perforator would then access the billing data and would store it on paper tape by punching the appropriate holes on the tape. Then the perforator would return a check signal back to the recorder indicating that it had successfully stored the next of information. The recorder, then provided the next line of information and the perforator would operate in a similar manner. As mentioned previously, the recorders provide three basic types of AMA information, namely, initial entries, answer entries and disconnect entries. Since each recorder serves 100 trunks, the AMA information for each trunk would normally be interspersed with the AMA information for all the other trunks. Thus, for example, recorder RCDR0 might receive an initial entry for one trunk followed by a disconnect entry for another trunk and so on. To process the raw AMA information on the paper tape into data useful for customer billing, the paper tapes were read backwards, and when a disconnect entry was read for a particular trunk, then the machine processing the paper tape would look for an answer and finally an initial entry for that particular trunk. All specifics concerning the call are available from these three entries and the appropriate billing information can then be generated.

Emergency recorder RCDREMG is not operable when each of the other recorders is operating successfully. However, when a trouble condition is detected for one of the other recorders, then the emergency recorder is manually placed in service and receives billing data from the 100 trunks normally associated with the out-of-service recorder.

In accordance with this one illustrative embodiment of my invention, a billing data transmitter comprising duplicated encoders E0 and E1 is provided to gather billing data directly from the recorders via their associated recorder control circuits RCC_ and to transmit the processed billing data directly to a remote processor RP which may be hundreds of miles from the encoders. To elaborate, each encoder comprises an 8-bit self-checked programmable controller. This controller in turn comprises duplicated microprocessors which operate in complete synchronism and perform matching operations at the end of each cycle. For example, encoder E0 comprises microprocessors 0A and 0B. Each encoder also comprises a scanner such as SCN0 which includes a 480 point scan point matrix. These scan points are high input impedance devices which provide an interface between the electromechanical apparatus in the telephone central office and the lower voltage circuits in the microprocessors. These scanners are adapted to detect the 28 data bits in each line of information as well as the states of a plurality of control leads in each recorder indicating various statuses associated with the billing data such as test calls, emergency recorder calls, etc. Thus, billing data and control information is applied to scanners SCN0 and SCN1 from each of the recorders via their associated recorder control circuits RCC_ and the respective cables DC_. As described in greater detail . hereinafter, each scanner also includes certain scan points associated with the operation of the other encoder so that each encoder monitors the operation of its counterpart encoder.

Each encoder also includes a 64-point signal distributor such as SDO in encoder E0. Each point comprises a flip-flop and high-speed mercury relay responsive to the state of the flip-flop for operating a make contact which in turn controls the state of relays in the recorder control circuits RCC.

The microprocessors communicate with the peripheral circuits including the scanner and signal distributor via two main buses, the peripheral address bus PAB and the peripheral data bus PDB. To elaborate, microprocessors 0A and 0B respectively provide an address on output buses 0A0 and 0B0 identifying a row of scan points in scanner SCN0, which address is gated into peripheral address register PAR from bus 0A0. Then, the address in register PAR is received by bus extender circuit BET which buffers the address because the scanner and signal distributor operate at much slower speeds than the microprocessors. This address is then decoded, and the identified row of scan points in scanner SCN0 is interrogated and the states of all interrogated scan points are returned to bus extender BET, and placed on peripheral data bus PDB, and applied to both microprocessors 0A and 0B over input bus IB.

The states of a row of distribute points in signal distributor SDO are controlled in a similar manner. First the address of a particular row is loaded into register PAR, then this address is stored in circuit BET, and data indicating the new states of the points in this row is placed on peripheral data bus PDB from output bus 0B0 and applied to bus extender BET. Signal distributor SDO changes the states of the flip-flops in the designated row and these flip-flops in turn indirectly control the states of relays in the recorder control circuits RCC as mentioned previously. For example, distributor SDO controls the states of relays in each of the circuits RCC0-RCC10 over cables RC0-RC10 respectively.

AMA information received from the recorders by scanner SCN0 is first placed in buffer memory BM under the control of microprocessors 0A and 0B and then on a subsequent instruction is presented to input-output channel IOC and then the data set (not shown) in circuit IOC modulates the data for serial transmission over data link DL0 to remote processor RP.

FIG. 1 illustrates the circuitry in encoders E0 and E1 only to the extent necessary to fully understand the principles of our invention. The specific operation of each encoder is described in some detail in S. D. Coomer patent application, Ser. No. 626,338, filed Oct. 28, 1975, now U.S. Pat. No. 4,020,459, issued Apr. 26, 1977. Moreover, one suitable microprocessor is described in R. W. Sevcik patent application Ser. No. 450,896, filed Mar. 13, 1974, now U.S. Pat. No. 3,931,505 issued Jan. 6, 1976.

Each encoder receives billing data from each of the recorders RCDR0-RCDR9 (and RCDREMG when required) via associated recorder control circuits RCC0-RCC9 (and RCC10). The microprocessors in each encoder operate in complete synchronism. However, each encoder E0 and E1 operates independently and not in synchronism. Each encoder examines the billing data from each of the recorders, but only buffers billing data for those recorders assigned to it as "primaries" and returns check signals to the recorders indicating that the received data was valid and properly received. Thus, for example, encoder E1 is assumed to be primary encoder for the even recorders namely RCDR0, RCDR2 . . . RCDR10, while encoder E0 is primary for the odd recorders, RCDR1, RCDR3 . . . RCDR9. Thus, encoder E1 receives billing data from each of the recorders RCDR0-RCDREMG via circuits RCC0-RCC10 and cables DC0-DC10. Encoder E1 checks the validity of all billing data by checking that the data is in the proper one-out-of-three, three-out-of-three or two-out-of-five format. However, encoder E1 only stores billing data for recorders RCDR0, RCDR2 . . . for subsequent transmission to the remote processor RP.

Each recorder control circuit such as RCC0 is uniquely associated with a recorder such as RCDR0 and includes state information which indicates to both encoders the primary-secondary status for the recorder. For this example, we will assume that recorder RCDR0 is primarily associated with encoder E1 and secondarily associated with encoder E0 as indicated by circuit RCC0. Thus, while both encoders check the validity of the data from recorder RCDR0, only encoder E1 buffers the data and then later transmits the data to remote processor RP.

When recorder RCDRO has data, the state of one of its control leads changes, and this change is independently detected by each of the encoders through interrogation of their respective scanners. Each encoder then independently controls its scanner to preliminarily scan the 28 data bits associated with recorder RCDRO receives via cable DCO which extends to both scanners. Then both encoders independently scan all control leads of RCDRO leads to determine what action will be required on the data. Then both encoders independently scan the data a second time, logically "OR" the second scan information with the preliminary data and perform the normal one-out-of-three, three-out-of-three or two-out-of-five check on the logical result. Assuming that each encoder has received valid data, then each will provide a check signal to recorder control circuit RCCO over cables RCO and ZO respectively. The check signal from primary encoder E1 passes through circuit RCCO to recorder RCDRO, and indicates that the data has been successfully received. The check signal from the secondary encoder is also applied to a circuit RCCO but is blocked in RCCO from reaching recorder RCDRO.

In accordance with an aspect of our invention, each encoder is adapted to detect the presence or absence of the check signal provided by the other encoder. For example, encoder E1 will detect that encoder E0 did provide a check signal to RCCO via cable RCO, as indicated over cable DCO to scanner SCN1 and, accordingly, will continue with its normal operations. Encoder EO will operate similarly to detect whether E1 provided a check signal. The primary encoder E1 will then convert 28 bits of billing data from recorder RCDRO into binary coded decimal data, append the recorder number and timing information on answer and disconnect entries, store the combined data in its buffer and later transmit the data to remote processor over data link DL1. The buffer memory operates on a first-in first-out basis, so that billing data is transmitted to remote processor RP in the order in which such data was received from the recorders and stored therein.

Now assuming that "primary" encoder E1 provided a check signal indicating a line of received data was valid while encoder E0 did not provide this check signal. Secondary encoder E0 would detect the presence of the check signal in encoder E1 and would be aware of its own failure to generate a check signal and in accordance with its program, would presume that it had not received valid data, whereas encoder E1 had received valid data. Encoder E0 would then control the state of logic (not shown in FIG. 1) in recorder control circuit RCCO to prevent encoder E0 from assuming primary status in regard to recorder RCDRO.

Now assume the contrary situation in which encoder E1 did not provide a check signal, whereas encoder E0 did. Since encoder E1 was primary for recorder RCDRO, and failed to provide a check signal, recorder RCDRO would not receive a check signal indicating this information had been received. The recorder would time out and generate a trouble report in accordance with its normal operations. Then, encoder E1 through scanner SCN1 would detect that encoder E0 had provided a check signal. Encoder E1 would then presume that it was malfunctioning due to internal problems or a malfunction in the leads running from recorder control circuit RCCO to its scanner SCN1. Accordingly encoder E1 would then alter the state of circuitry (not shown in FIG. 1) in recorder circuit RCCO which circuitry in turn would change the primary-secondary status of recorder RCDRO so that encoder E0 would now be primary for this recorder.

For subsequent billing data from recorder RCDRO and from the odd numbered recorders RCDR1, RCDR3 . . . , encoder E0 now transmits the data to the remote processor. However, prior to transmission of such data for RCDRO, the remote processor must be informed of the "switchover" from encoder E1 to E0 so that continuity of billing can be maintained for all calls on the trunks served by recorder RCDRO. Thus, encoder E1 generates a "relinquish" message, places this message in its buffer memory and subsequently transmits it to remote processor RP via data link DL1. This message indicates that recorder RCDRO is being transferred to encoder E0. Encoder E0 responsive to the new state of the primary-secondary indications in recorder control circuit RCCO detects that a switch has occurred and it generates an "acceptance" message. This message is placed in its buffer memory BM. To ensure that the relinquish message is received before the acceptance message, the transmission of all information from encoder E0's buffer memory is inhibited for a predetermined time interval such as 8 seconds. During this time interval, encoder E0 does not send data in response to polling messages from remote processor RP. However, it continues to store in its buffer memory, billing data from all recorders for which it is primary, now including recorder RCDRO.

If remote processor RP receives the relinquish message before the acceptance message, then the processing of billing information can be continued in the normal manner with the exception that further billing information pertaining to recorder RCDRO is now expected over data link DL0. However, if the acceptance message is received before the relinquish message, then the possibility exists that billing data for recorder RCDRO might have been lost, and accordingly, a disconnect may have gone undetected. The failure to detect this disconnect would mean that a subscriber was being overcharged for a call. To avoid this possibility of misbilling, all potentially affected calls served by recorder RCDRO are charged only for an initial period or when appropriate no charge is made.

Assuming that neither encoder returned check signals for RCDRO, then each encoder would detect that the other recorder had not generated a check signal and each would presume the data itself was invalid and no switch-over would take place. Recorder RCDRO would time out and generate a trouble report. For subsequent AMA information, both encoders operate in a normal manner.

Thus, in accordance with one feature of our invention, each recorder is assigned on a primary-secondary basis to the redundant encoders. Each encoder checks the validity of data from each of the recorders. However, each encoder only transmits data back to the remote processor pertaining to those recorders for which it has primary responsibility.

Furthermore in accordance with another aspect of our invention, when the primary encoder detects invalid data or is otherwise incapacitated, and when the secondary encoder returns a check signal indicating that it has received valid data and can process it, the primary encoder generates a change signal in the associated recorder control circuit causing the primary-secondary status of the encoders to be switched.

Thus, in accordance with another aspect of our invention, duplicated encoders operating independently share the load in regard to processing billing data from a plurality of recorders on a primary-secondary basis. When the primary encoder detects that it can no longer handle data from a particular recorder, it alters the primary-secondary status indications for only that recorder. Thus, merely because an encoder has difficulty in receiving valid data from a particular recorder, the primary-secondary control indications are not altered for the other recorders.

In accordance with still another feature of our invention, the relinquishing encoder transmits a message to the remote processor indicating that a switchover is taking place. The accepting encoder generates an acceptance message; however the accepting encoder inhibits the transmission of all data to the remote processor for a predetermined time so hopefully the relinquish message will arrive at the remote processor before the acceptance message. Thus, the billing for trunks served by the involved recorder can be continued without any billing changes.

In accordance with still another aspect of our invention, the relinquish, acceptance, and delay scheme described above is also beneficially utilized in manual changes of the primary-secondary statuses of the encoders. Thus when an encoder is going to be placed out-of-service for routine maintenance, the status indications in the recorder control circuits are manually changed. The other encoder then assumes responsibility for all recorders and no loss of billing revenue is anticipated because relinquish messages for all affected recorders should be received before the corresponding acceptance messages so that the continuity in reception of billing information at the remote processor is not interrupted.

DETAILED DESCRIPTION

Figure 3:
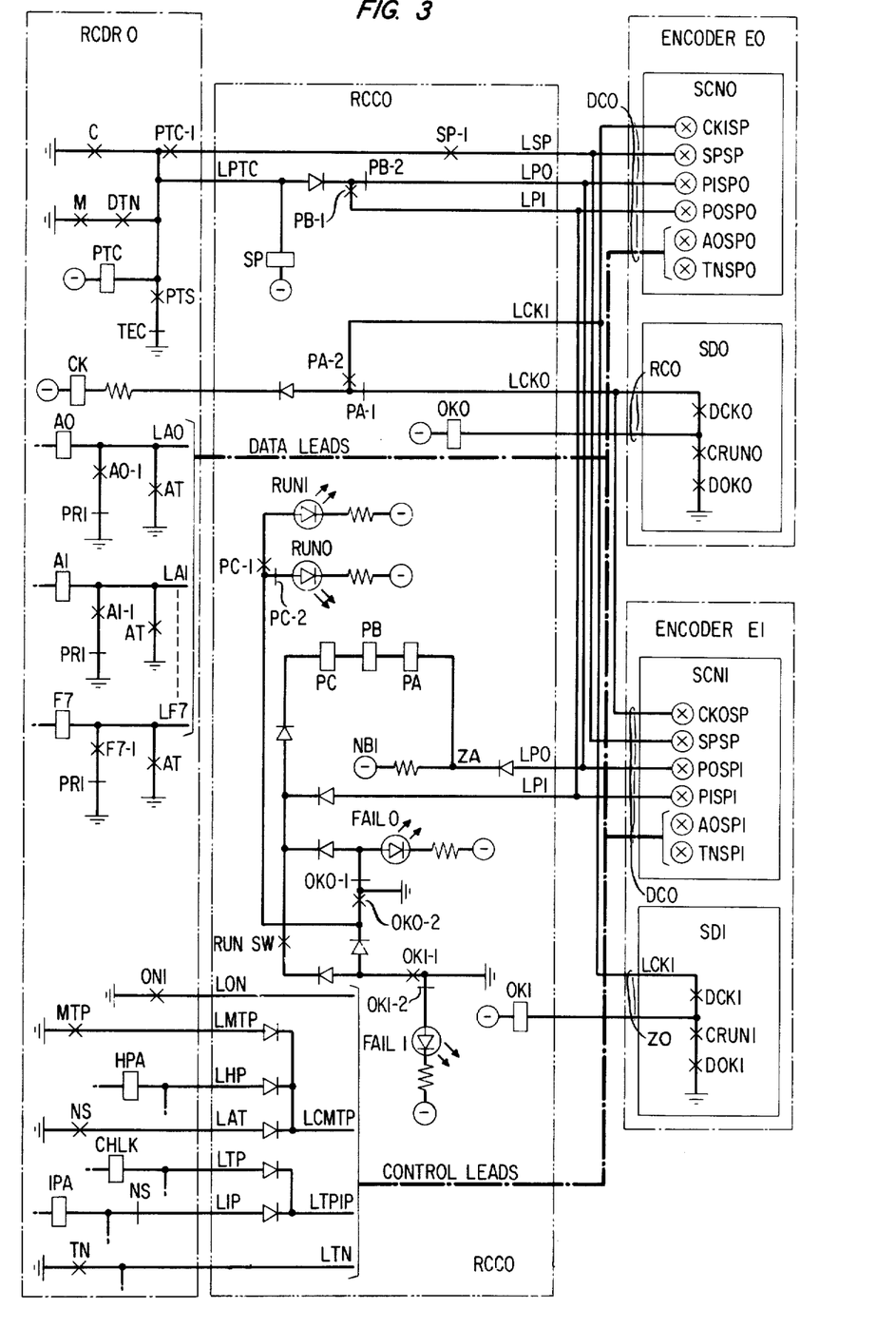
FIG. 3 illustrates portions of the circuitry in recorder circuit RCDRO in FIG. 1, circuitry in recorder control circuit RCCO and the corresponding signal distribute and scan points in encoders E0 and E1.

FIG. 3 illustrates the source of data and control information in recorder RCDRO, the circuitry in RCCO which is operative to transfer the primary-secondary status indications for RCDRO, and the scan point and signal distribute points in both encoders corresponding to recorder control circuit RCCO and recorder RCDRO. It should be understood that similar circuitry is provided in each of the other recorder control circuits RCC1-RCC10 in FIG. 1 and similar scan and distribute points are provided for each of the other recorders. Each encoder operates independently in regard to each of the recorder control circuits RCC. The scan points and signal distribute points are symbolically shown in FIG. 3. For more details in regard to the circuitry of these points, the above-mentioned Coomer application can be consulted.

Since many recorders may be presenting data to the encoders simultaneously, it is necessary for each encoder to time-share its activities among all recorders. Thus, only certain of the encoder tasks will be performed for a given recorder each time the encoder cycles through all the recorders. On subsequent cycles the remainder of the work for that line of data will be accomplished. The time that it takes the encoder to step through all recorders and perform some operations of the total work for each recorder is called a "processor cycle" and is nominally 7 milliseconds. Breaking up the work in this manner requires that each encoder keep track of which task was performed for a recorder on any given processor cycle so that on the next processor cycle it will know the work that must then be done. The encoder program performs this bookkeeping function by assigning "progress marks" to the various tasks. The program then keeps track of which progress marks should be entered on each processor cycle. There are five progress marks, i.e., the IDLE PROGRESS mark, the CHECK PROGRESS mark, the WAIT1 PROGRESS mark, the WAIT2 PROGRESS mark and the TROUBLE PROGRESS mark. Each of these will be described in more detail in subsequent paragraphs.

Turning now to FIG. 3, it will be assumed that initially encoder E1 is primary for recorder RCDRO and encoder E0 is secondary and no data is present in RCDRO. This primary-secondary relationship is initially established manually by setting the open or closed state of contact RUNSW also known as the RUN switch. When RUN switch (contact) is closed, current flows from ground through closed contact OK1-1, closed contact RUNSW and through relays PA, PB and PC to negative battery. Each of these relays is energized, operating corresponding sets of contacts. For example, relay PC operates so that contact PC-1 closes and contact PC-2 opens. Current flows from ground through closed contact PC-1 and diode RUN1 to negative battery, which is −48 volts. This diode is of a light-emitting variety and accordingly, a visible indication is given that encoder E1 is primry because diode RUN1 is lit. If encoder E0 were primary, then contact PC-2 would be closed because relay PC is not activated (RUN switch is open) and accordingly, the RUN0 diode would give a visible indication. Assuming again that E1 is primary, relay PA operates to close contact PA-2 and open contact PA-1. As described below, this allows only a check signal from encoder E1 to be transmitted to the check relay CK in recorder RCDRO. When this CK relay operates it indicates to the recorder that it should progress to its next line of billing information. The operation of relay PB closes contact PB-1 and opens contact PB-2. Thus, lead LPO assumes a voltage of −48 because it is connected to source NB1 via lead ZA. Lead LP1 floats around −48 because it is connected to negative battery in the associated scan points. Leads LP0 and LP1 are applied to scan points in each of the encoders (P1SPO and P0SPO in SCNO and P0SP1 and P1SP1 in SCN1 respectively) and the states of these leads in combination indicates to the encoders their primary-secondary relationship for recorder RCDRO. This will be described in greater detail hereinafter.

IDLE PROGRESS MARK

When no data is present in recorder RCDRO, relay PTC and relay PTS (not shown) are normal; this causes lead LPTC not to be grounded and signal present relay SP remains not operated and accordingly, lead LSP is not grounded. Each of the scanners scans its scan point SPSP which is associated with lead LSP and detects that this lead is not grounded and each encoder thereby determines that no data is present in RCDRO. This forces the encoder program to enter an IDLE PROGRESS mark wherein the following audits are made to ensure valid control leads. A check is made to ensure that the SPSP scan point is not grounded while either scan points P0SP_ or P1SP_ is at ground. This check detects a faulty SPSP scan point. If a check fails for 8 consecutive processor cycles, the TROUBLE PROGRESS mark is entered.

Each encoder E0 and E1 provides an indication of its own sanity via contacts CRUN0 and CRUN1 respectively. These contacts respectively control relays OK0 and OK1. During each processor cycle, numerous self-checks are made between the results of the microprocessors in each encoder. Such checks include internal matches, bus matches, timing checks to detect that certain timing indications are met and numerous other such diagnostic tests. These tests are described in great detail in the above-metnioned Coomer application and serve to control a STOP flip-flop (not shown) if a fault is detected. The detection of such a major fault affecting all recorders will cause the encoder to release its CRUN_ contact which in turn releases the associated OK__ relay. For example, if encoder E0 detects a bus mismatch between results of microprocessors OA and OB, relay OK0 is released. As mentioned hereinafter, relay OK0 may also be released when encoder E0 determines that it has received invalid data from a particular recorder while the other encoder has received valid data, and a "switchover" is needed.

Also during the IDLE PROGRESS mark, the state of lead LON in FIG. 3 is verified to ensure that it is not grounded. This lead is monitored to indicate how long recorder RCDRO has been continuously busy. If calls are stacked up for this recorder, contact ON1 will remain essentially closed (except for approximately 100 ms open periods). As described hereinafter, this LON lead is monitored to generate an indication of the maximum possible time that a trunk was waiting to seize recorder RCDRO. This time interval is then subtracted from each disconnect entry for trunks served by that recorder so that a subscriber will not be charged for the time interval required for the disconnect to be recorded. This is one of the thrusts of the invention described in the above-mentioned R. B. Curtis et al application. In the billing data transmitter this timing is performed under software control rather than using the various timers ITM1-ITM4 in the Curtis et al application; however, the concept is identical.

The encoder program will continue entering the IDLE PROGRESS mark on every processor cycle until a line of data is presented by a recorder. When data is present, contact PTS will close supplying an operate path to relays PTC and SP. Relay SP, a mercury relay, will operate prior to relay PTC. Contact SP-1 closes and thereafter contact PTC-1 closes applying around potential to lead LSP. This ground potential is detected at scan points SPSP in each of the scanners SCN0 and SCN1. Each encoder will then independently execute the following sequence. The digit leads from the recorder will be scanned and stored. These digit leads are shown as leads LA0, LA1, . . . LF7 in FIG. 3. As previously mentioned, these data leads utilize the format illustrated in FIG. 2. The various data leads will either be at −48 volts or at ground depending upon whether the respective relays A0, A1 . . . F7 are operated or not operated. For example, if relay A0 is operated, then contact A0 will close, applying ground to lead LA0 via contact PR1. A separate scan point is provided in each scanner corresponding to each of the data leads. For example, with reference to scanner SCN0, scan point AOSP0 monitors lead LA0 and in scanner SCN1, scan point AOSP1 monitors lead LA0. Recorder RCDRO in addition to the data leads also includes a plurality of control leads which indicate the type of call that is involved and what kind of entry is required. For example, lead LON, as mentioned previously, indicates how long recorder RCDRO has been continuously busy and leads LMTP, LHP and LAT each indicates various types of test calls in which no data is sent to the remote processor. These last three test indications are monitored over a single lead LCMTP. Lead LIP is grounded for initial entries in normal calls, and lead LTP is grounded for answer and disconnect entries for normal calls. These last two leads are monitored via scan points associated with lead LTPIP. Lead LTN when grounded indicates that this recorder has been manually transferred to the emergency recorder. When an encoder detects a start indication for the emergency recorder (SPSP scan point for RCDREMG), it scans all the TN leads to detect which recorder is out-of-service. The program substitutes the identity of the out-of-order recorder for the emergency recorder in all billing data handled by the emergency recorder so that the remote processing unit does not have to contend with transfers between recorders and the emergency recorder.

Each encoder then checks the master timer preference and transverter or indexer preference over leads LCMTP and LTPIP respectively. Only one of these two leads should be grounded because either a test call is indicated or a regular call is indicated, but not both. Each encoder also checks its POSP_ and PISP_ scan points for a one-out-of-two indication. One of these scan points should be at ground potential while the other one is at negative battery. As mentioned previously when the P1SP_ scan point for a particular encoder is grounded, this indicates to that encoder that it has primary responsibility for the particular recorder. For example, when encoder E1 is primary for RCDRO, the PA, PB and PC relays are operated and lead LP1 is grounded via closed contact PB-1, lead LPTC and closed contacts PTS and TEC to ground. Moreover, lead LPO is at a potential of −48 because contact PB-2 is open. Thus for encoder E1 scan point P1SP1 is at ground, while scan point P0SP1 is at −48 volts. In contrast, scan point P1SP0 in encoder E0 is at negative 48 volts while scan point POSP0 is at ground. Since scan point P0SP0 is at ground potential, this indicates the encoder E0 that it has a secondary relationship to recorder RCDRO.

If either of the above two checks regarding the control leads fails, the encoder detecting this failure enters the TROUBLE PROGRESS mark on the next processor cycle. If the control leads passed the check, the encoder enters the CHECK PROGRESS mark on the next processor cycle. It will be assumed that these control leads pass the checks.

CHECK PROGRESS MARK

When an encoder enters the CHECK PROGRESS mark, it rescans the billing information over leads LAO-LF7 and logically ORs this information with the results previously stored from the first scan. A two-out-of-five check is then performed on each of the digits B-F, while a one-out-of-three or three-out-of-three check is made on the A digit. If the check passes, the encoder operates its DCK__ contact to provide a checkback signal to the recorder. For example, ground is applied through closed contacts DOK1, CRUN1 and DCK1 to lead LCK1, and through closed contact PA-2 to operate the relay CK in recorder RCDRO. The operation of relay CK indicates to the recorder that the present line of data has been successfully received. Assuming that encoder EO also found the line of data to be valid, it will also apply a check signal back toward recorder RCDR0. This check signal on lead LCKO is inhibited from reaching the recorder by open contact PA-1. If the data was valid, the encoder enters the WAIT1 PROGRESS mark on the next processor cycle.

If the check fails, the failing encoder checks the status of its SPSP scan point to determine what further action should be taken. Assuming that encoder E1 detected invalid data and did therefore not close contact DCK1 and, a check signal was not returned to recorder RCDRO. If encoder E1 now finds that the SPSP scan point is still grounded, indicating the recorder is still presenting data, encoder E1 will continue to enter the CHECK PROGRESS mark on the subsequent processor cycles. Because encoder E1 is assigned as primary for this recorder, the check signal will not be returned, and the PTC timer (not shown) in recorder RCDRO will time out, causing a trouble record to be taken. After the trouble record is taken, ground will no longer be applied on lead LPTC and, accordingly, the SP relay will release and scan points SPSP will no longer be at ground potential because contact SP-1 opens.

Encoder E1 must now determine if the check failure was caused by invalid data from the recorder or if the error was only associated with the operation of encoder E1. To accomplish this, encoder E1 checks the status of scan point CKOSP which monitors whether a check signal was returned by encoder E0. Assuming that lead LCKO is at ground, indicating that encoder E0 successfully received valid data from RCDRO, scan point CKOSP would so indicate. Encoder E1 then assumes that its own circuits have failed. Encoder E1 then releases relay OK1 is opening contact DOK1. As mentioned previously relay OK1 is operated only as long as encoder E1 believes that it can handle information from recorder RCDRO. The release of relay OK1 closes contacts OK1-2 and current flows through light-emitting diode FAIL1, thereby visibly indicating that encoder E1 has failed with regard to recorder RCDRO. Contact OK1-1 opens removing the prior ground path for the PA, PB, and PC relays through closed contact RUNSW, assuming lead LPTC is not grounded. Accordingly, the PA, PB, and PC relays release to thereby transfer the primary and secondary indications for this recorder. The elaborate contact PC-2 closes. Diode RUNO provides a visible indication that encoder E0 is now primary. Contact PC-1 opens extinguishing light-emitting diode RUN1. Contact PA-1 closes and PA-2 opens so that the check signal from encoder E0 will now be returned to CK relay. Contact PB-2 closes and PB-1 opens so that neither leads LP1 or LP0 is grounded because lead LPTC is not grounded. However, when lead LPTC is grounded indicating that new billing information is present in RCDRO, lead LP0 will be grounded. Accordingly, scan point P1SP0 in encoder E0 will be at ground potential indicating that this encoder E0 will be at ground potential indicating that this encoder is primary and scan point POSP1 in encoder E1 will be at ground potential indicating this encoder is secondary. After encoder E1 released distribute point DOK1 as described previously, it enters the WAIT2 PROGRESS mark in the next processor cycle.

If encoder E0 did not return a check signal either in the above example, encoder E1 assumes that the fault exists in the recorder and directly enters the WAIT2 PROGRESS mark during this processor cycle.

The table below summarizes the various failure combinations based upon the then existing primary-secondary relationships of the encoder for a given recorder and further summarizes the actions taken.

| State of PA, PB, PC Relays | Failure Encountered | RCC Action | P1SP0 Scan Point of ENCODER E0 | P1SP1 Scan Point of ENCODER E1 |
|---|---|---|---|---|
| Operated (Encoder 1 is Primary) | Encoder E0 Fails | Light Fail 0 | Remains Not Grounded | Remains Grounded |
| | Encoder E1 Fails | Light Fail 1 and Release PA-PC Relays so that Encoder 0 is Primary | Becomes Grounded | Becomes Not Grounded |
| Not Operated (Encoder 0 is Primary) | Encoder E0 Fails | Light Fail 0 and Operate PA-PC Relays so that Encoder 1 is primary | Becomes not Grounded | Becomes Grounded |
| | Encoder E1 Fails | Light Fail 1 | Remains Grounded | Remains Not Grounded |

The WAIT1 PROGRESS MARK

The WAIT1 PROGRESS mark is entered with an encoder successfully checks the data as described previously in regard to the CHECK PROGRESS mark. On subsequent processor cycles for this recorder, the encoder continues to enter this progress mark until the SPSP scan point is no longer at ground potential. This will occur when the recorder's CK relay is successfully operated by a check signal from the primary encoder (assume E1) and the data input from the recorder has been released. The encoder will then release its check distribute point DCK_. Encoder E1, since it is primary for recorder RCDRO, loads the data into its buffer in binary coded decimal format and then returns to the IDLE PROGRESS mark. Encoder E1 is then ready to process a new line of data. Encoder E0, after releasing its distribute point DCKO also returns to the IDLE PROGRESS mark, but as described previously does not buffer the information for subsequent transmission to the remote processor.

The WAIT2 PROGRESS MARK

The WAIT2 PROGRESS mark is entered each time an encoder detects that an invalid line of data has been received from a recorder, as previously described in regard to the CHECK PROGRESS mark. This WAIT2 PROGRESS mark is always entered on one processor cycle and exited on the next cycle, thereby merely producing a delay before entering the next progress mark. In leaving the WAIT2 PROGRESS mark, the encoder will flag the data received as invalid, place it in its buffer if the encoder is primary and then enter the IDLE PROGRESS mark. The encoder is then ready to accept a new line of data from RCDRO, and operates in accordance with the now existing primary-secondary status indications.

THE TROUBLE PROGRESS MARK

The TROUBLE PROGRESS mark is entered whenever there has been a control lead failure in the IDLE PROGRESS mark, as described above, or when there is an audit failure of the SPSP scan point and the scan point associated with load LON during the CHECK PROGRESS mark or duing the WAIT2 PROGRESS mark. This audit failure is caused by a condition whereby the SPSP scan point is at a ground potential while the scan point associated with lead LON is not at a ground condition. When this condition occurs, the encoder assumes that the SPSP scan point is stuck at a ground condition and reenters the TROUBLE PROGRESS mark. The encoder will enter the TROUBLE PROGRESS mark on all subsequent progress cycles until the SPSP scan point returns to its non-grounded state. It will then enter the IDLE PROGRESS mark in the next processor cycle and will be ready to process a new line of data.

MESSAGE GENERATION INFORMING REMOTE PROCESSOR OF SWITCHOVER

When encoder E1 detected that it has received invalid data, but encoder E0 had received valid data, the primary-secondary status of the encoders was switched for RCDRO after encoder E1 released relay OK1 during the CHECK PROGRESS mark, as described above. Then encoder E1 entered the WAIT2 PROGRESS mark for one cycle and then returned to the IDLE PROGRESS mark to receive new data from RCDRO. All subsequent data for recorder RCDRO will be conveyed by encoder EO to the remote processor rather than the encoder E1 as was done previously because of swithover in primary-secondary indications in RCCO. Remote processor RP in FIG. 1 must be advised of this switch in encoders to maintain the continuity of billing information for all the 100 trunks served by recorder RCDRO. To accomplish this, encoder E1 detects that the state of the P1SP1 and POSP1 scan points have switched states, and encoder E1 now recognizes its secondary status. Accordingly, it generates a relinquish message which is loaded into buffer memory, and subsequently transmitted over data link DL1 to remote processor RP in the normal data sequence because buffer memory is controlled to operate on a first-in first-out basis. This relinquish message indentifies recorder RCDRO and indicates that encoder E1 is no longer transmitting the data received from recorder RCDRO.

Encoder E0 also detects the reversal in states of its scan points POSPO and P1SPO and realizes it now has primary responsibility for encoder RCDRO. Encoder E0 then generates an acceptance message and places this message in its buffer memory BM. However, in accordance with its stored program, it then inhibits the transmission of any data from its buffer memory to the remote processor and replies "no data" to all polling messages from the remote processor. At the end of a predetermined time interval, of approximately 8 seconds (based on size of buffer memory and rate of transmission), normal transmission between the remote processor and encoder E0 is continued.

The remote processor should receive the relinquish message before ihe acceptance message. Thus the remote processor realizes that all subsequent information for recorder RCDRO will be received over data link DL0 rather than DL1 and can maintain the proper sequential relationship for the incoming billing data for this recorder. It is anticipated that the remote processor will serve numerous billing data transmitters, and will include normal multiplexing and demultiplexing apparatus for sending and receiving messages in regard to the billing data transmissions.

If the acceptance message arrives before the relinquish message, then a discontinuity in data reception may have occurred and accordingly, billing for the trunks served by this recorder must be modified to prevent any possibility of overbilling. The latter condition could occur where the relinquishing encoder went insane and was stopped to inhibit the mutilation of data. In this situation, the relinquish message may never be sent to remote processor and accordingly the answer billing alterations will have to be made.

MANUAL SWITCHOVER OF ENCODERS

The transfer of one or more recorders from one encoder to the other can also be accomplished manually without the loss of any billing data. Assuming now that encoder E0 is primary, contact RUNSW would be open and relays PA, PB, and PC would not be operated. Assuming that the malfunction in encoder E1 has been corrected, its OK1 relay would be operated as would the OKO relay asociated with encoder E0. Assuming that the craft person wanted to return a recorder RCDRO to its normal primary association with encoder E1, he or she would merely close switch RUNSW which would operate the PA, PB, and PC relays, and accordingly would change the application of ground potential to the LP1 and LP0 leads when lead LPTC was grounded. Each of the encoders would detect the change of these leads via their scanners and thereby the new primary-secondary relationship. Encoder E0 would generate a relinquish message since its status was changed from primary to secondary, and this message would be subsequently transmitted to the remote processor. Encoder E1 would generate an acceptance message because its status had changed from secondary to primary, and would then place this message in its buffer memory and then inhibit the transmission of all messages to the remote processor for the predetermined time interval. Thus, the continuity of billing information for recorder RCDRO would be maintained during normal maintenance action by craft persons and accordingly no revenue loss would result.

What is claimed is:

1. For use with a plurality of recorders generating message accounting information in a telecommunication system, the combination comprising
    first and second data processing units each independently operative to receive each generation of information from each of said recorders and to check the validity of the information received thereat,
    said first processing unit having means for controlling system responses to said recorders including means for buffering the information received from said recorders and means for transmitting said buffered information to a remote processor,
    said second processing unit including means for providing a check indication if information received from said recorders is valid,
    said first processing unit including means responsive to receipt of invalid information from one of said recorders and to said chekc indication for corresponding information received by the second processing unit for selectively transferring control of said one recorder to said second processing unit, and means for generating a relinquish message and for controlling said transmission means to transmit said relinquish message to the remote processor, and said second processing unit including means responsive to said transfer of control for generating an acceptance message, means for buffering said acceptance message, and means for transmitting said buffered acceptance message to the remote processor after a predetermined time interval, wherein said second processing unit controls said last named buffering means for buffering and transmitting to the remote processor information received from said one recorder subsequent to said transfer of control.

2. The combination in accordance with claim 1 wherein each of said first and second processing units comprises a pair of duplicated microprocessors operating in synchronism, and a scanner for receiving information from each of said recorders and wherein said check indication providing means comprises a signal distributor point.

3. For use in a telecommunication system having a plurality of recorders generating message accounting information pertaining to calls in said telecommunication system, an intermediate data reception system comprising first and second data processing units each independently operative to receive blocks of information from each of said recorders and to check the validity of each block received thereat, a first recorder control circuit associated with a first one of said recorders and including means for indicating to said processing units that said first unit is primarily responsible for said first recorder and that said second unit is secondarily responsible for said first recorder, a second recorder control circuit associated with a second one of said recorders and including means for indicating to said processing units that said first unit is secondarily responsible for said second recorder and that said second unit is primarily responsible for said second recorder, said first and second units each including means for independently providing a check signal in conjunction with each data block received indicating that the information block received is valid, said first unit including first storing means responsive to a said check signal from the check signal providing means in said first unit for storing an information block received from said first recorder and first transmission means for transmitting said stored block to a remote processor, said second unit including second storing means responsive to another said check signal from said second unit for storing information from said second recorder and second transmission means for transmitting said last-named stored information to the remote processing unit, said first unit further including means responsive to a third said check signal from said second unit indicating that a valid information block was received from said first recorder and to said first unit's detection of a corresponding invalid information block from said first recorder for controlling said first recorder control circuit to indicate that said first processing unit is secondarily responsible for said first recorder and said second processing unit is primarily responsible for said first recorder, said first unit having means responsive to the change in primary and secondary responsibility indications from said first recorder control circuit for generating a relinquishment message, means for controlling said first storing means to store said relinguishment message, and means for controlling said first transmission means to transmit said relinquishment message to said remote processing unit, and said second unit having means responsive to the change in primary and secondary responsibility indications from said first recorder control circuit for generating an acceptance message, for controlling said second storing means to store said acceptance message and to store subsequent information blocks received from said first recorder, and for inhibiting said second transmission means from transmitting said acceptance message and information blocks stored in said second storing means to said remote processing unit for a predetermined time interval.

4. The telecommunication system in accordance with claim 3, wherein said first recorder control circuit further comprises switch means manually operable to control said first recorder control circuit to indicate that said first unit is secondarily responsible for said first one recorder and said second unit is primarily responsible for said first one recorder.

5. In combination, a plurality of first recorders each for generating information, a plurality of second recorders each for generating information, first and second data links to a remote processor, and first and second data processing units each for receiving the same information from each of the recorders and for independently checking the validity of the information received said first unit including a first buffer for buffering information received from said first recorders and first transmitting means for transmitting the information buffered in said first buffer to said remote processor via said first data link, said second unit including a second buffer for buffering information received from said second recorders and second transmitting means for transmitting the information buffered in said second buffer to said remote processor via said second data link, said first and second units each including means for independently generating respective first and second check signals if the corresponding information received by each unit from one of said recorders is valid, said first unit including means responsive to the detection by said first unit of invalid information from one of said first recorders and the presence of a corresponding said second check signal for generating a switch signal, said first unit including means responsive to said switch signal for selectively controlling a switch of said one first recorder from the plurality of first recorders to the plurality of second recorders, for generating a relinquish message for indicating to the remote processor the switch of said one first recorder and for controlling said first buffer to buffer said relinquish message and for controlling said first transmitting means to transmit said relinquish message to said remote processor via said first data link, and said second unit including means responsive to said switch signal for generating an acceptance message acknowledging the switch of said one first recorder to the plurality of second recorders, for controlling said second buffer to buffer said acceptance message, and for controlling said second transmitting means to inhibit transmission over said second data link to said remote processor for a predetermined time interval and to transmit said buffered acceptance message to said remote processor after the termination of said interval.

6. The method of data reception in a system including a plurality of data sources, a remote processing unit, and first and second data processing units comprising the steps of independently checking the validity of data blocks from the data sources in the first and second units, storing valid data blocks checked by the first unit in a first memory, transmitting data blocks stored in the first memory to the remote unit, generating a check signal in the second unit if one of the data blocks checked thereat from one of the data sources is valid, generating a transfer signal in the first unit jointly responsive to the check signal and to an invalid data block in the first unit corresponding to the last-mentioned valid data block in the second unit from the one data source, terminating the storing of data blocks from the one data source in the first memory responsive to the transfer signal, storing valid data blocks received by the second unit from the one data source subsequent to generation of the transfer signal in a second memory, responsive to the transfer signal generating a relinquish message in the first unit and an acceptance message in the second unit, transmitting the relinquish message from the first unit to the remote unit, timing a predetermined interval responsive to the transfer signal, inhibiting the transmission of data blocks and the acceptance message from the second unit to the remote unit during the predetermined interval, and transmitting the acceptance message and data blocks stored in the second memory from the second unit to the remote unit after the termination of the predetermined interval.

7. In a data reception and transmission arrangement wherein a first data processing unit checks data from a data source, stores checked data in a first memory and transmits the stored data to a remote processing unit, and wherein a second data processing unit checks the data from the data source and provides an indication of the validity of the checked data, the method of maintaining the continuity of data transmission when a transfer signal is generated indicating control of the data source is to be transferred from the first to the second data processing unit, comprising the steps of responsive to the transfer signal, generating in the first data processing unit a relinquish message indicating that control of the data source has been relinquished, transmitting the relinquish message to the remote processing unit, responsive to the transfer signal, generating in the second data processing unit an acceptance message indicating that control of the data source has been accepted, storing the acceptance message in a second memory in the second data processing unit and storing checked data from the data source in the second memory, inhibiting in the second data processing unit the transmission to the remote processing unit of the acceptance message and data stored in the second memory for a predetermined time interval, and after the termination of the time interval, transmitting the acceptance message and data stored in the second memory to the remote processing unit.

8. The method of data reception from a first plurality and a second plurality of data sources in a system including first and second data processing units, comprising the steps of transmitting data blocks from each of the data sources to each of the processing units, independently checking the validity of each data block received by each unit, processing in the first unit only ones of the data blocks received valid by the first unit from the first data sources, processing in the second unit only ones of the data blocks received valid by the second unit from the second data sources, generating a check signal if a data block is received valid by the second unit from one of the first data sources, selectively transferring said one data source from the plurality of first data sources to the plurality of second data sources jointly responsive to the check signal and to the receipt by the first unit of an invalid data block corresponding to said one valid data block received by the second unit, and responsive to the transfer, processing subsequent data blocks received valid from said one data source only in the second unit.

9. An apparatus for processing data blocks received from a plurality of data sources in a system including first and second processing units, wherein said first unit is initially assigned primary and secondary status for the processing of data blocks with respect to first and second ones of the sources, and said second unit is initially assigned primary and secondary status for the processing of data blocks mutually exclusive with respect to said second and first ones of the sources, comprising:

means for assigning the primary and secondary status to each said unit, means in each said first and second unit for independently checking the validity of each data block received from each source, means in each said first and second unit for independently processing only those data blocks which have been received by the unit from each source for which the unit is assigned primary and which have been determined to be valid by its associated checking means, and means, responsive to the receipt of a valid data block by the assigned secondary unit for a given one of the data sources and to the receipt of said data block determined to be invalid by the checking means associated with the assigned primary unit for said given one of the data sources, for causing the assigning means to switch selectively the primary and secondary status assignments of the processing units with respect to said given one of the sources independently of the primary and secondary status assignments for the other ones of the sources.

10. In combination, a plurality of data sources, first and second data processing units, each for independently receiving and checking the validity of data blocks from each of the data sources, a plurality of control circuits individually associated with different ones of the data sources, each control circuit having means for assigning, independently of the other control circuits, one of the processing units as primary and the other processing unit as secondary for processing the data from its associated data source, each of the processing units having means for independently providing a validity check signal in response to each reception of a valid data block from the data sources, and each of said processing units further including means, independently responsive to the reception of an invalid data block from a given one of the data sources for which the processing unit has been assigned as primary and responsive to the concurrent independent generation of a validity check signal from the validating means within the corresponding secondary processing unit for the same data block from said given data source, to cause the control circuit associated with said given data source to switch selectively the assignment of the respective primary and secondary statuses of the processing units with respect to only said given data source.

11. The combination in accordance with claim 10 further comprising a first data link extendible from said first processing unit to a remote processing unit, and a second data link extendible from said second processing unit to the remote processing unit, wherein said first processing unit comprises first storage means for storing the data blocks received by said first processing unit from ones of the data sources for which it is primary, first transmission means for transmitting data blocks stored in said first storage means to said remote processing unit via said first data link, and means responsive to a selective switch of the first processor to secondary status for one of the data sources for generating a relinquish message and for controlling said first transmission means to transmit said relinquish message to said remote processing unit, and wherein said second processing unit comprises second storage means for storing data blocks from ones of the sources for which it is primary, second transmission means for transmitting data blocks stored in said second storage means to said remote processing unit via said second data link, and means responsive to the selective switch of the second processing unit to primary status for said one data source for generating an acceptance message, for controlling said second storage means to store said acceptance message and for controlling said second transmission means to transmit said stored acceptance message after the termination of a predetermined time interval.

12. The combination in accordance with claim 11 wherein each of said data sources is a recorder generating message accounting information in a telecommunication system and wherein each of said first and second processing units comprises a pair of duplicated microprocessing units operating in synchronism.

13. The combination in accordance with claim 10 wherein each said control circuit includes switch means manually operable to switch selectively the respective primary and secondary statuses of the processing units for the data source associated with the control circuit, wherein the processing unit to be made secondary for one of the data sources by an operation of one of the switch means includes means responsive to the operation for generating a relinquish message and means for transmitting said relinquish message to a remote processing unit, and the processing unit to be made primary by the operation of said one switch means includes means independently responsive to the operation for generating an acceptance message, means for storing said acceptance message, and means for transmitting said stored acceptance message to said remote processing unit after a predetermined time interval.

* * * * *

UNITED STATES PATENT AND TRADEMARK OFFICE
CERTIFICATE OF CORRECTION

PATENT NO. : 4,040,023

DATED : August 2, 1977

INVENTOR(S) : Robert B. Curtis and Nelson A. Riedel

It is certified that error appears in the above-identified patent and that said Letters Patent are hereby corrected as shown below:

Column 11, line 44, "around" should read --ground--. Column 12, line 40, "the" should read --to--. Column 13, line 46, "is" should read --by--; line 58, "The elaborate" should read --To elaborate,--. Column 14, line 2, after "encoder" the remainder of the line should be deleted; line 3, "this encoder" should be deleted; line 36, "with" should read --when--. Column 15, line 36, "the" should read --by--. Column 16, line 26, "has" should read --had--.

Signed and Sealed this

Eleventh Day of April 1978

[SEAL]

Attest:

RUTH C. MASON
Attesting Officer

LUTRELLE F. PARKER
Acting Commissioner of Patents and Trademarks